United States Patent Office 3,347,687
Patented Oct. 17, 1967

3,347,687
ZIRCON REFRACTORY
George R. Henry, Bethel Park, Pa., assignor to Harbison-Walker Refractories Company, Pittsburgh, Pa.
No Drawing. Filed Jan. 7, 1966, Ser. No. 519,007
2 Claims. (Cl. 106—57)

ABSTRACT OF THE DISCLOSURE

Ceramically bonded pressed zircon shapes made from a batch comprising 95 to 99.5%, by weight zircon and about 0.5 to 5% alkali phosphate.

Background

Zircon refractories are generally known for their resistance at elevated temperatures to acid slags, glass melts, and molten metals. They are used, for example, in glass tanks and as nozzles for continuous metal casting. They have also been suggested for the lining of malleable iron cupolas. It is an object of this invention to provide a zircon refractory shape with improved physical properties. It is another object of this invention to provide a ceramically bonded pressed zircon shape made from a batch containing an alkali phosphate.

Brief description of the invention

Briefly, according to one aspect of this invention, zircon shapes are pressed from a batch comprising, by weight, about 95 to 99.5% zircon and about 0.5 to 5% of an alkali phosphate, preferably a phosphate glass. In a preferred aspect of this invention, the batch comprises about 97 to 99% zircon and about 1 to 3% alkali phosphate. The batch is preferably sized and graded so that about 50 to 80%, by weight, is +200 mesh and about 15% is −400 mesh. While it is permissible that the batches be pressed into shapes on a power press, it is preferable that they be shaped on an impact press. After pressing, the shapes are dried and, thereafter, burned between about cone 16 and cone 20.

The objects and advantages of this invention will become more clear by a careful study of the following examples. Table I includes the batches used in the preparation of Examples A, B, and C, and a tabulation of several critical properties. Examples A and B are typical of the prior art. Example A has a temporary chemical bond which burns out on firing. Example B has a clay addition which, on firing, provides a more spall-resistant brick. Example is made according to the teachings of this invention. Example C contains 2% of a sodium phosphate glass which, on firing, provides a unique chemically-resistant bond.

TABLE I

| Example No. | A | B | C |
|---|---|---|---|
| Batch: | | | |
|   Zircon (percent) | 100 | 95 | 100 |
|   Clay (percent) | | 5 | |
| Bonds: | | | |
|   Lignin liquor binder (percent) | 2.5 | 1 | |
|   Polyethylene glycol | 0.3 | | |
|   Sodium phosphate glass (percent) | | | 2 |
|   Water | | 1 | 2 |
| Bulk density, pcf. (Av. 3) | 227 | 224 | 233 |
| Modulus of rupture, p.s.i. (Av. 2) | 2,070 | 2,100 | 4,120 |
| Apparent porosity (Av. 2) (percent) | 21.7 | 21.0 | 17.3 |
| Special spalling test, one hour to 2,200° F., samples 4½ x 2½ x 2" cut from brick—mixes A, B, C | | No cracks | |
| Dynamic slag test at 2,800° F. using grains of Cupola slag: | | | |
|   Volume erosion, cc | 22 | 21 | |
|   Depth of penetration, inches | 0.4 to 0.6 | 0 to 0.25 | |

The batches in Table I were tempered with sufficient water so that on mixing they obtained a pressable character. After mixing, the brick were impact pressed. The brick were then dried at about 250° F. for about five hours, and thereafter burned at cone 18.

Table I establishes that sodium phosphate glass additions to zircon mixes increases brick density and substantially increases brick strength. The phosphate provides an unusual reduction in the apparent porosity of the brick. High bulk density, high strength, and low apparent porosity have traditionally been considered desirable brick properties. These are provided by brick made according to this invention. However, for particular applications, more specific considerations must be made. Nozzles to be used in the continuous casting process must have good thermal shock resistance; that is, tendency not to crack or spall on rapid heating. A test was devised to measure the resistance of zircon brick to thermal shock. In this test, samples are heated to 2200° F. in one hour, and thereafter observed for cracking. All of the brick in Table I survived this test. Results of this test indicate that Example C would be especially useful as nozzles for continuous casting.

Two of the examples in Table I were subjected to a Dynamic Slag Test, wherein iron cupola slag was dripped over samples inclined 30° to the horizontal at 2800° F. The samples were then observed for erosion and penetration. The results of this test indicate that brick made according to this invention have an increased resistance to penetration of slags.

Commercially available zircon is manufactured by a process which beneficiates certain beach sands. The product of this process is known as "granular," because it is usually finer than 65 mesh. It is possible to manufacture coarser zircon grogs (for example, −10+65 mesh) at an added expense.

Suitable alkali phosphates for use in the practice of this invention are sodium and potassium ortho and pyrophosphates. The alkali phosphate glasses are preferred. They generally have an alkali oxide-phosphate ratio from about 1:1 to 2:1. The sodium hexametaphosphates of various chain lengths have been found most suitable. Alkaline earth phosphates do not work.

The primary source of zircon is beach sands. Zircon generally contains less than 2% impurities, the remainder being $ZrO_2$ and $SiO_2$ in a 1 to 1 mole ratio. The use of less pure zircon would, however, be within the scope of this invention. The typical chemical analysis of the zircon used in the examples is given in Table II.

TABLE II

| | Zircon, percent |
|---|---|
| Silica ($SiO_2$) | 32.3 |
| Alumina ($Al_2O_3$) | 1.0 |
| Titania ($TiO_2$) | 0.2 |
| Iron oxide ($Fe_2O_3$) | 0.2 |
| Lime (CaO) | 0.16 |
| Zirconia ($ZrO_2$) | 66.1 |
| Magnesia (MgO) | 0.04 |

Having thus described the invention in detail and with sufficient particularity as to enable those skilled in the art to practice it, what is desired to have protected by Letters Patent is set forth in the following claims.

I claim:
1. Method of making ceramically bonded pressed zircon shapes comprising the steps of:
    (1) preparing a batch of about 95 to 99.5% zircon and about 0.5 to 5% alkali phosphate, by weight;
    (2) tempering with sufficient water so that the batches obtain a pressable character;
    (3) forming the batches into shape by impact pressing;

(4) drying the shapes at about 250° F. for about five hours; and
(5) burning the dried shapes at about cone 18.

2. Method of making ceramically bonded pressed zircon shapes comprising the steps of:
   (1) preparing a batch of about 95 to 99.5% zircon and about 0.5 to 5% alkali phosphate, by weight;
   (2) tempering with sufficient water so that the batches obtain a pressable character;
   (3) forming the batches into shape by pressing;
   (4) drying the shapes; and
   (5) burning the dried shapes.

References Cited

UNITED STATES PATENTS

| 2,681,860 | 6/1954 | Rhodes et al. | 106—57 |
| 2,880,097 | 3/1959 | Emhiser | 106—57 |

FOREIGN PATENTS

| 1,028,944 | 5/1966 | Great Britain. |

TOBIAS E. LEVOW, *Primary Examiner.*

JAMES E. POER, *Examiner.*

UNITED STATES PATENT OFFICE
CERTIFICATE OF CORRECTION

Patent No. 3,347,687                            October 17, 1967

George R. Henry

It is hereby certified that error appears in the above numbered patent requiring correction and that the said Letters Patent should read as corrected below.

Column 1, line 51, after "Example" insert -- C --; same column 1, TABLE I, third column, lines 11 and 12 thereof, strike out $$\begin{matrix} 21 \\ 0 \text{ to } 0.25 \end{matrix}$$

and insert the same in lines 10 and 11 of the fourth column.

Signed and sealed this 29th day of October 1968.

(SEAL)
Attest:

Edward M. Fletcher, Jr.
Attesting Officer

EDWARD J. BRENNER
Commissioner of Patents